US009064175B2

(12) United States Patent
Mutsuo et al.

(10) Patent No.: US 9,064,175 B2
(45) Date of Patent: Jun. 23, 2015

(54) IMAGE PROCESSING APPARATUS

(71) Applicant: KYOCERA Document Solutions Inc., Osaka-shi (JP)

(72) Inventors: Toshiaki Mutsuo, Osaka (JP); Masaki Baba, Osaka (JP)

(73) Assignee: Kyocera Document Solutions Inc. (JP)

( * ) Notice: Subject to any disclaimer, the term of this patent is extended or adjusted under 35 U.S.C. 154(b) by 54 days.

(21) Appl. No.: 14/086,346

(22) Filed: Nov. 21, 2013

(65) Prior Publication Data
US 2014/0147036 A1    May 29, 2014

(30) Foreign Application Priority Data

Nov. 27, 2012   (JP) .................................. 2012-258800

(51) Int. Cl.
*G06K 9/00* (2006.01)
*G06K 9/34* (2006.01)
*G06K 9/46* (2006.01)
*G06T 7/00* (2006.01)
*G06K 9/38* (2006.01)

(52) U.S. Cl.
CPC .............. *G06K 9/344* (2013.01); *G06K 9/4652* (2013.01); *G06T 7/0083* (2013.01); *G06K 9/342* (2013.01); *G06K 9/38* (2013.01)

(58) Field of Classification Search
CPC ........ G09G 5/02; G06T 11/60; G06T 7/0083; G06K 9/38; G06K 9/342; G06K 9/344; G06K 9/4652; G06K 9/00442; G06K 9/00463; H04N 1/40062; H04N 1/4092; H04N 1/409; H04N 1/40012; H04N 1/6072

USPC .......................................................... 382/164
See application file for complete search history.

(56) References Cited

U.S. PATENT DOCUMENTS

| 2004/0264793 | A1* | 12/2004 | Okubo | .......................... 382/243 |
| 2008/0175476 | A1* | 7/2008 | Ohk et al. | ..................... 382/176 |
| 2008/0298718 | A1* | 12/2008 | Liu et al. | ...................... 382/284 |
| 2010/0310170 | A1* | 12/2010 | Li et al. | ......................... 382/173 |

FOREIGN PATENT DOCUMENTS

| JP | 2005-500709 | 1/2005 |
| JP | 2007-336000 | 12/2007 |

OTHER PUBLICATIONS

Suen, H.M., Wang, J.F. "Text String Extraction from Images of Colour-Printed Documents", IEEE Proc-Vls. Image Signal Process, vol. 143, No. 4, Aug. 1996, pp. 210-216.

* cited by examiner

*Primary Examiner* — Ali Bayat

(57) ABSTRACT

Regarding a color difference between a color of an original image on a pixel other than a connection pixel set in a rectangular area that is an inside area of a rectangle circumscribed to the connection pixel set and a color of the original image on a pixel in the connection pixel set, the binary image generating unit (a) identifies whether the connection pixel set is a character or non character by comparing a value of an index that indicates unevenness of the color differences with a color difference threshold value, (b) identifies whether a size of the rectangular area is small or large on the basis of a threshold value, and (c) sets the color difference threshold value as a value if the size of the rectangular area is small and as another different value if the size of the rectangular area is large.

8 Claims, 3 Drawing Sheets

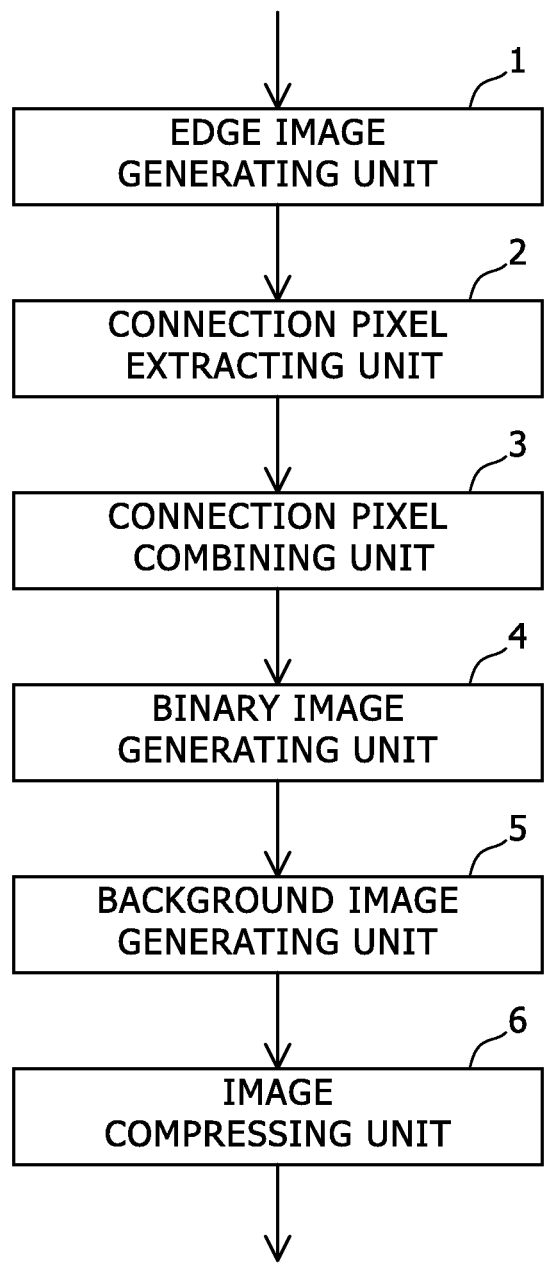

IMAGE PROCESSING APPARATUS

CROSS-REFERENCE TO RELATED APPLICATIONS

This application relates to and claims priority rights from Japanese Patent Application No. 2012-258800, filed on Nov. 27, 2012, the entire disclosures of which are hereby incorporated by reference herein.

BACKGROUND

1. Field of the Present Disclosure

The present disclosure relates to an image processing apparatus.

2. Description of the Related Art

An image processing apparatus separates characters and a background image from an original image.

When detecting a character in an original image, a rectangular area is identified which is circumscribed to a black pixel set obtained in a labeling process, and the rectangular area is set as a character detection target if a size of the rectangular area is small, and on the basis of a labeling rate, a circumference length rate, or the like, it is determined whether the rectangular area is set as a character detection target if a size of the rectangular area is large. The labeling rate means a ratio of the number of pixels in the black pixel set to the number of all pixels in the rectangular area, and the circumference length rate means a ratio of the number of black pixels adjacent to white pixels to the number of all pixels in the rectangular area.

However, when detecting a character in the aforementioned manner, if a size of the rectangular area is large, it is required to calculate the labeling rate, the circumference length rate, or the like, and therefore, it is difficult to detect a character in a short time.

SUMMARY

An image processing apparatus according to an aspect of the present disclosure includes an edge image generating unit, a connection pixel extracting unit, a binary image generating unit, a background image generating unit, and an image compressing unit. The edge image generating unit is configured to detect edges in an original image and to generate an edge image formed by the detected edges. The connection pixel extracting unit is configured to extract connection pixel sets in the edge image. The binary image generating unit is configured to classify the connection pixel sets by colors and generate respective character images which are binary images corresponding to the colors. The background image generating unit is configured to generate a background image of the original image on the basis of the character images. The image compressing unit is configured to compress image data of the character images and image data of the background image using respective different compressing methods. Regarding a color difference that is a difference between a color of the original image on a pixel other than the connection pixel set in a rectangular area that is an inside area of a rectangle circumscribed to the connection pixel set and a color of the original image on a pixel in the connection pixel set, the binary image generating unit is further configured (a) to identify whether the connection pixel set is a character or non character by comparing a value of a predetermined index that indicates unevenness of the color differences with a color difference threshold value, (b) to identify whether a size of the rectangular area is small or large on the basis of a predetermined threshold value, and (c) to set the color difference threshold value as a value if the size of the rectangular area is small and as another different value if the size of the rectangular area is large.

Therefore, misdetection is reduced even if a size of the rectangular area is large, and character detection is performed correctly and fast.

These and other objects, features and advantages of the present disclosure will become more apparent upon reading of the following detailed description along with the accompanied drawings.

BRIEF DESCRIPTION OF THE DRAWINGS

FIG. 1 shows a block diagram which indicates a configuration of an image processing apparatus according to an embodiment of the present disclosure;

DETAILED DESCRIPTION

Figure 2A:
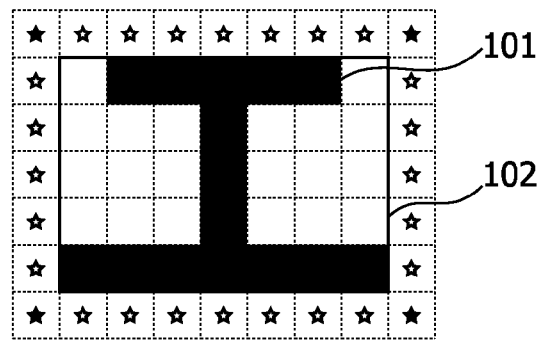
FIGS. 2A to 2C show diagrams which indicate examples of connection pixel sets extracted in the image processing apparatus shown in FIG. 1.

Hereinafter, an embodiment according to an aspect of the present disclosure will be explained with reference to drawings.

FIG. 1 shows a block diagram which indicates a configuration of an image processing apparatus according to an embodiment of the present disclosure. The image processing apparatus shown in FIG. 1 is formed, for example, with an ASIC (Application Specific Integrated Circuit), a computer, and so forth. Image data of sorts of images such as an original image is stored in a RAM (Random Access Memory), a non volatile memory, or the like. The ASIC and a processor in the computer forms processing units mentioned below.

An edge image generating unit 1 detects edges in an original image, and generates an edge image formed by the detected edges. In this embodiment, the edge image is an image which indicates positions of pixels on a high density side of the detected edges, and a binary image. Therefore, values of the pixels on a high density side of the detected edges are 1, values of the other pixels are 0.

In this embodiment, the original image is a gradational color image, and the edge image generating unit 1 generates an image of only a luminance component of the original image, detects edges in the generated image, and generates the edge image formed by the detected edges.

A connection pixel extracting unit 2 extracts a connection pixel set in the edge image, and manages a series of connection pixels so as to enable them to be identified as a set. Therefore, when a connection pixel set and another connection pixel set are not connected, the connection pixel sets are managed so as to enable them to be identified as two different sets. A connection pixel set consists of either a single pixel or plural pixels which are concatenated to each other among the aforementioned pixels on the high density side (i.e. pixels with the pixel value of 1).

A connection pixel combining unit 3 detects the connection pixel sets to which the circumscribed rectangles are close to each other and groups the detected connection pixel sets as one connection pixel set. Therefore, if two connection pixel sets are grouped, then they are managed as one connection pixel set. For example, connection pixel sets are grouped if a predetermined condition is satisfied such as a condition that one of rectangles circumscribed to the connection pixel sets is overlapped to the other in a part or a condition that a distance between rectangles circumscribed to the connection pixel sets is shorter than a predetermined threshold value.

A binary image generating unit 4 classifies the connection pixel sets by colors of the connection pixel sets (i.e. colors in the original image) and generates respective character images corresponding to the colors. The character images are binary images. Here the character image is generated on the basis of connection pixel sets except for a connection pixel set which does not correspond to a character.

For example, regarding five connection pixel sets A to E, if connection pixel sets A and B in an original image have a first color, connection pixel set C in the original image has a second color (a different color from the first color), connection pixel sets D and E in an original image have a third color (a different color from the first and the second colors), then for the first color a character image is generated in which pixel values in positions of the connection pixel sets A and B are 1 and pixel values in the other positions are 0, for the second color a character image is generated in which pixel values in positions of the connection pixel set C are 1 and pixel values in the other positions are 0, and for the third color a character image is generated in which pixel values in positions of the connection pixel sets D and E are 1 and pixel values in the other positions are 0.

The binary image generating unit 4 regards a difference (i.e. a distance in UV plane) between a color (i.e. values of U coordinate and V coordinate in YUV color space as a color of the original image) on a pixel other than the connection pixel set in a rectangular area that is an inside area of a rectangle circumscribed to the connection pixel set and a color (i.e. values of U coordinate and V coordinate in YUV color space as a color of the original image) on a pixel in the connection pixel set. The binary image generating unit 4 identifies whether the connection pixel set is a character or non character by comparing a value of a predetermined index that indicates unevenness of the color differences with a color difference threshold value.

It should be noted that the aforementioned unevenness of the color differences may be unevenness of color differences between respective pixels other than the connection pixel set and respective pixels in the connection pixel set or may be unevenness of differences between an average value of colors on pixels other than the connection pixel set and respective colors on pixels in the connection pixel set.

In this process, the binary image generating unit 4 identifies whether a size of the rectangular area is small or large on the basis of a predetermined threshold value, and sets the color difference threshold value as a value if the size of the rectangular area is small and as another different value if the size of the rectangular area is large.

Here, if at least one of widths of the rectangular area in a primary scanning direction and a secondary scanning direction is equal to or larger than a predetermined threshold value, then it is identified that a size of the rectangular area is large; and otherwise it is identified that a size of the rectangular area is small.

Further, the binary image generating unit 4 may identify whether the connection pixel set is a character or non character using a difference between a largest value and a smallest value of the color differences in the connection pixel set as the aforementioned index.

Furthermore, the binary image generating unit 4 may identify whether the connection pixel set is a character or non character using a dispersion value of the color differences in the connection pixel set as the aforementioned index.

In addition, in this embodiment, the binary image generating unit 4 identifies whether the connection pixel set is a character or non character by comparing a value of the predetermined index with the color difference threshold value if a luminance difference between a pixel in the connection pixel set in the rectangular area and a pixel other than the connection pixel set in the rectangular area is either equal to or larger than a predetermined threshold value, and identifies that the connection pixel set is non character if a luminance difference between a pixel in the connection pixel set in the rectangular area and a pixel other than the connection pixel set in the rectangular area is smaller than a predetermined threshold value.

A background image generating unit 5 generates a background image of the original image on the basis of the aforementioned character images. Specifically, the background image generating unit 5 identifies positions of characters in the aforementioned character image (i.e. pixel positions in which pixel values are 1) on the basis of the character image, and generates a background image by changing pixel values of original image in the identified positions in the following manner.

For example, the background image generating unit 5 generates the background image by changing pixel values in a position of the character image (i.e. positions of pixels with the pixel value of 1 in the character image) in the original image to an average value of pixel values of the original image on at least a part of surrounding pixels of the rectangle.

Figure 2B:
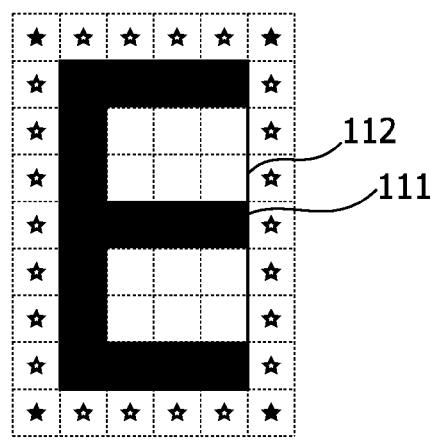
Figure 2C:
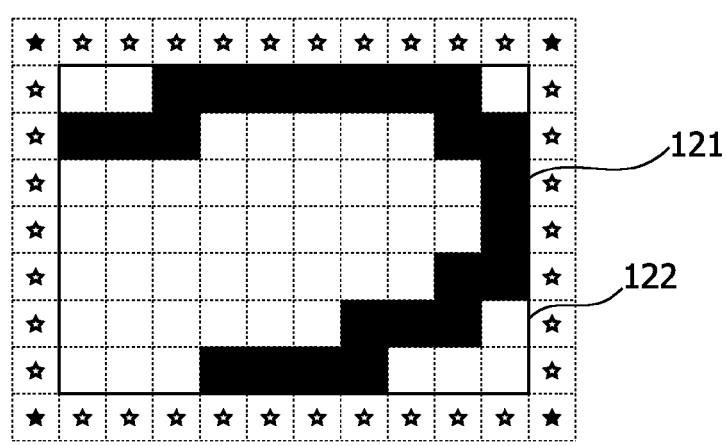

FIGS. 2A to 2C show diagrams which indicate examples of connection pixel sets extracted in the image processing apparatus shown in FIG. 1.

In an example shown in FIG. 2A, the original image includes a Japanese character. In this example, a connection pixel set 101 is detected, and a rectangle 102 circumscribed to the connection pixel set 101 is identified. In this example, on the basis of pixel values of the original image on pixels with star marks around the rectangle 102, pixel values of the background image in positions of this connection pixel set 101 are determined. In addition, a pixel area inside of the rectangle 102 is the aforementioned rectangular area of this case.

In an example shown in FIG. 2B, the original image includes a character "E". In this example, a connection pixel set 111 is detected, and a rectangle 112 circumscribed to the connection pixel set 111 is identified. In this example, on the basis of pixel values of the original image on pixels with star marks around the rectangle 112, pixel values of the background image in positions of this connection pixel set 111 are determined.

In an example shown in FIG. 2C, the original image includes another Japanese character. In this example, a connection pixel set 121 is detected, and a rectangle 122 circumscribed to the connection pixel set 121 is identified. In this example, on the basis of pixel values of the original image on pixels with star marks around the rectangle 122, pixel values of the background image in positions of this connection pixel set 121 are determined.

It should be noted that, for example, the background image generating unit 5 may generate the background image by changing pixel values in a position of the character image in the original image to an average value of pixel values of the original image on all of surrounding pixels of the aforementioned rectangle. Further, the background image generating unit 5 may generate the background image by changing pixel values in a position of the character image in the original image to an average value of pixel values of the original image on four pixels (pixels with black star marks in FIGS. 2A to 2C) positioned at four corners among surrounding pixels of the aforementioned rectangle.

If there are groups of connection pixel sets, then the binary image generating unit 4 classifies the groups of connection pixel sets by colors of the group of connection pixel sets, and generates character images corresponding to the colors. In this process, if a color of a group of connection pixel sets is identical to a color of another ungrouped connection pixel set, then the group and the ungrouped connection pixel set are included in a same character image.

An image compressing unit 6 compresses image data of the aforementioned character images and image data of the background image using respective different compressing methods. For example, image data of the character image is compressed using MMR (Modified Modified READ) method, and image data of the background image is compressed using JPEG (Joint Photographic Experts Group) method. It should be noted that there are pieces of data of which the number is same as the number of the colors, and respective ones of the pieces of data are compressed. Further, a value of each color is managed so as to be related to compressed image data of that color.

In the following part, a behavior of the aforementioned image processing apparatus is explained.

Firstly, the edge image generating unit 1 detects edges in an original image and generates an edge image formed by the detected edges.

Subsequently, the connection pixel extracting unit 2 extracts a connection pixel set in the edge image, and manages a series of connection pixels so as to enable them to be identified as one set.

The connection pixel combining unit 3 identifies positions and sizes of respective rectangles circumscribed to the connection pixel sets extracted by the connection pixel extracting unit 2, detects the connection pixel sets to which the circumscribed rectangles are close to each other and groups the detected connection pixel sets as one connection pixel set if the circumscribed rectangles are close to each other.

Subsequently, the binary image generating unit 4 classifies the connection pixel sets by colors of the connection pixel sets (i.e. colors in the original image) and generates respective character images corresponding to the colors.

In the aforementioned manner, respective color images of colors are generated.

Figure 3:
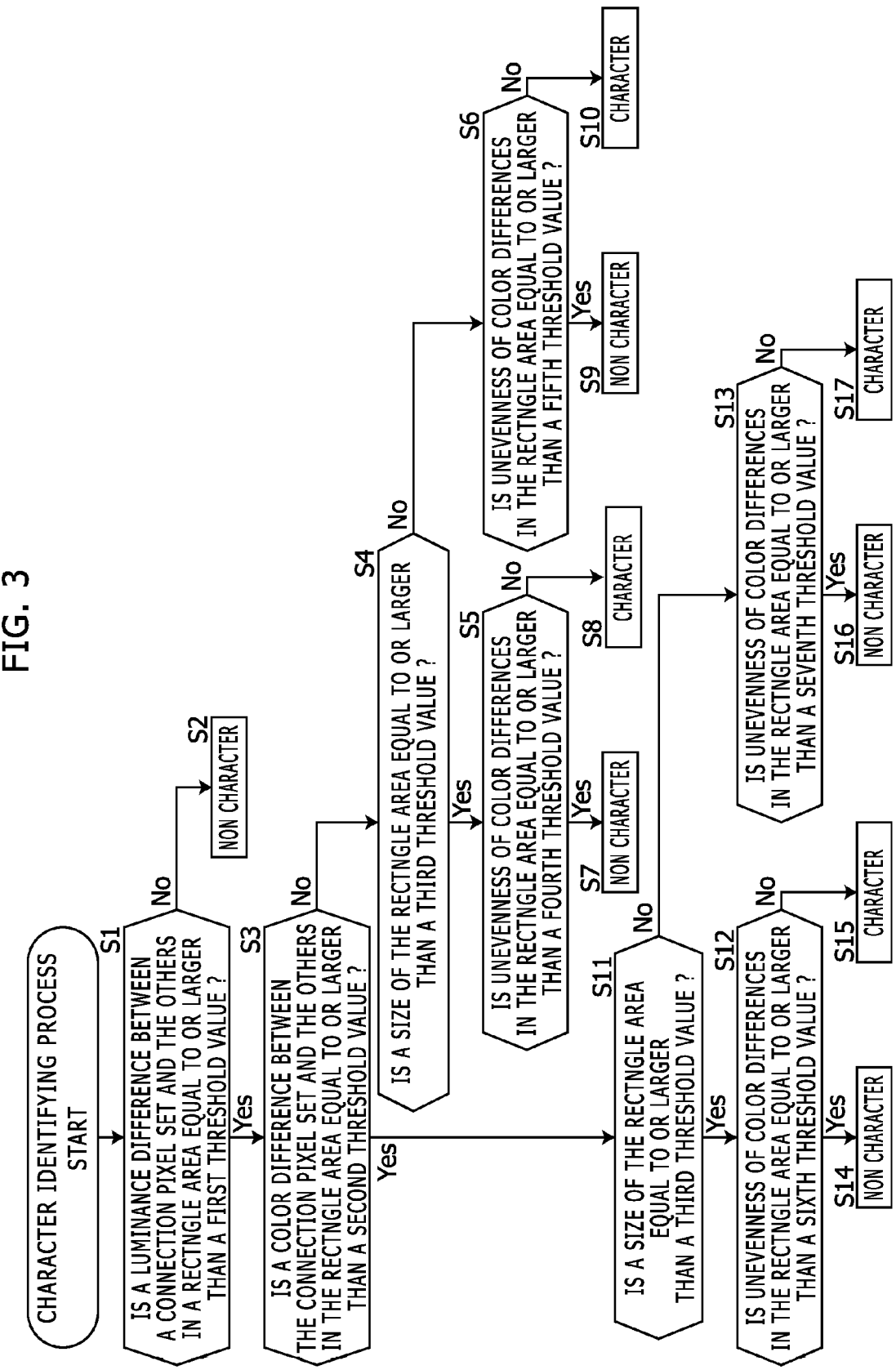
FIG. 3 shows a flowchart which explains a character identifying process performed by the binary image generating unit in FIG. 1.

Here is explained the character identifying process performed by the binary image generating unit 4. FIG. 3 shows a flowchart which explains a character identifying process performed by the binary image generating unit 4 in FIG. 1.

Firstly, the binary image generating unit 4 identifies whether a difference between a luminance value of the connection pixel set (e.g. an average value of luminance values on pixels in the connection pixel set) in the rectangular area and a luminance value of the other part than the connection pixel set (e.g. an average value of luminance values on pixels in this part) in the rectangular area is equal to or larger than a predetermined first threshold value (Step S1).

If the aforementioned difference of the luminance values is neither equal to nor larger than the predetermined first threshold value, then the binary image generating unit 4 identifies that the connection pixel set is non character (Step S2).

Otherwise, if the aforementioned difference of the luminance values is either equal to or larger than the predetermined first threshold value, then the binary image generating unit 4 identifies whether the connection pixel set is a character or not in the following manner.

Firstly, the binary image generating unit 4 identifies whether or not an average value of the color differences of the connection pixel set in the rectangular area is equal to or larger than a predetermined second threshold value (Step S3).

If the average value of the color differences is neither equal to nor larger than the predetermined second threshold value, then the binary image generating unit 4 identifies whether or not a size of the rectangular area is equal to or larger than a predetermined third threshold value (Step S4). If the size of the rectangular area is equal to or larger than the predetermined third threshold value then the binary image generating unit 4 identifies whether or not unevenness of the color differences of the connection pixel set is equal to or larger than a predetermined fourth threshold value (Step S5). If the size of the rectangular area is neither equal to nor larger than the predetermined third threshold value then the binary image generating unit 4 identifies whether or not unevenness of the color differences of the connection pixel set is equal to or larger than a predetermined fifth threshold value which is different from the fourth threshold value (Step S6). In Step S5, if the unevenness of the color differences of the connection pixel set is equal to or larger than the fourth threshold value, then it is identified that this connection pixel set is non character (Step S7); and otherwise it is identified that this connection pixel set is a character (Step S8). In Step S6, if the unevenness of the color differences of the connection pixel set is equal to or larger than the fifth threshold value, then it is identified that this connection pixel set is non character (Step S9); and otherwise it is identified that this connection pixel set is a character (Step S10).

Contrary to this, if the aforementioned average value of the color differences is either equal to or larger than the predetermined second threshold value, then the binary image generating unit 4 identifies whether or not a size of the rectangular area is equal to or larger than the predetermined third threshold value (Step S11). If the size of the rectangular area is either equal to or larger than the predetermined third threshold value then the binary image generating unit 4 identifies whether or not unevenness of the color differences of the connection pixel set is equal to or larger than a sixth threshold value that is different from the fourth threshold value (Step S12). If the size of the rectangular area is neither equal to nor larger than the predetermined third threshold value then the binary image generating unit 4 identifies whether or not unevenness of the color differences of the connection pixel set is equal to or larger than a seventh threshold value which is different from the sixth threshold value (Step S13). In Step S12, if the unevenness of the color differences of the connection pixel set is either equal to or larger than the sixth threshold value, then it is identified that this connection pixel set is non character (Step S14); and otherwise it is identified that this connection pixel set is a character (Step S15). In Step S13, if the unevenness of the color differences of the connection pixel set is either equal to or larger than the seventh threshold value, then it is identified that this connection pixel set is non character (Step S16); and otherwise it is identified that this connection pixel set is a character (Step S17).

Here the fifth threshold value is set so as to be larger than the fourth threshold value, the seventh threshold value is set so as to be larger than the sixth threshold value, the sixth threshold value is set so as to be larger than the fourth threshold value, and the seventh threshold value is set so as to be larger than the fifth threshold value.

For example, when each coordinate of YUV has 255 gradation values, the first threshold value is set as 8, the second threshold value is set as 16, the third threshold value is set as 115 (i.e. 10 millimeters), the fourth threshold value is set as 40, the fifth threshold value is set as 80, the sixth threshold value is set as 60, and the seventh threshold value is set as 255.

In the aforementioned manner, it is identified whether a connection pixel set is a character or non character. In this manner, even if a connection pixel set does not have a uniform color, character detection is correctly performed.

Subsequently, the background image generating unit 5 generates a background image of the original image on the basis of the aforementioned character images. As mentioned, the background image generating unit 5 generates the background image by changing pixel values in a position of the character image in the original image to an average value of pixel values of the original image on at least a part of surrounding pixels of the rectangle.

In the aforementioned manner, a background image is generated.

The image compressing unit 6 compresses image data of the aforementioned character images and image data of the background image using respective different compressing methods.

In the aforementioned manner, character images and a background image are separated from an original image and are compressed separately.

In the aforementioned embodiment, regarding a color difference that is a difference between a color of the original image on a pixel other than the connection pixel set in a rectangular area that is an inside area of a rectangle circumscribed to the connection pixel set and a color of the original image on a pixel in the connection pixel set, the binary image generating unit 4 identifies whether the connection pixel set is a character or non character by comparing a value of a predetermined index that indicates unevenness of the color differences with a color difference threshold value. The binary image generating unit 4 identifies whether a size of the rectangular area is small or large on the basis of a predetermined threshold value, and sets the color difference threshold value as a value if the size of the rectangular area is small and as another different value if the size of the rectangular area is large.

Therefore, misdetection is reduced even if a size of the rectangular area is large, and character detection is performed correctly and fast.

For example, in image data generated by a scanner, while an abnormal color sometimes occurs near a character edge due to optical system of the scanner, and in such a case, a character tends to be identified as non character, detecting a character in the aforementioned manner reduces misidentification between a character or non character.

The description has been presented for purposes of illustration and description, and is not intended to be exhaustive or limited.

For example, in the aforementioned embodiment, the binary image generating unit 4 may identify whether the connection pixel set is a character or non character by comparing differences between largest values and smallest values of luminance differences and color differences between pixels of the connection pixel set in the rectangular area and pixels other than the connection pixel set in the rectangular area (i.e. a distance between them in YUV space) with the color difference threshold value.

Further, in the aforementioned embodiment, the binary image generating unit 4 may identify whether the connection pixel set is a character or non character by comparing a dispersion value of differences between largest values and smallest values of luminance differences and color differences between pixels of the connection pixel set in the rectangular area and pixels other than the connection pixel set in the rectangular area (i.e. a dispersion value in YUV space) with the color difference threshold value.

Furthermore, in the aforementioned embodiment, it may be configured to uniformly identify that the connection pixel set is a character if a size of the rectangular area corresponding to the connection pixel set is smaller than the third threshold value.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
an edge image generating unit configured to detect edges in an original image and to generate an edge image formed by the detected edges;
a connection pixel extracting unit configured to extract connection pixel sets in the edge image;
a binary image generating unit configured to classify the connection pixel sets by colors and generate respective character images which are binary images corresponding to the colors;
a background image generating unit configured to generate a background image of the original image on the basis of the character images; and
an image compressing unit configured to compress image data of the character images and image data of the background image using respective different compressing methods;
wherein regarding a color difference that is a difference between a color of the original image on a pixel other than the connection pixel set in a rectangular area that is an inside area of a rectangle circumscribed to the connection pixel set and a color of the original image on a pixel in the connection pixel set, the binary image generating unit is further configured (a) to identify whether the connection pixel set is a character or non character by comparing a value of a predetermined index that indicates unevenness of the color differences with a color difference threshold value, (b) to identify whether a size of the rectangular area is small or large on the basis of a predetermined threshold value, and (c) to set the color difference threshold value as a value if the size of the rectangular area is small and as another different value if the size of the rectangular area is large.

2. The image processing apparatus according to claim 1, wherein the binary image generating unit is further configured to identify whether the connection pixel set is a character or non character by comparing a value of the predetermined index with the color difference threshold value if a luminance difference between a pixel in the connection pixel set in the rectangular area and a pixel other than the connection pixel set in the rectangular area is larger than a predetermined threshold value, and identify that the connection pixel set is non character if a luminance difference between a pixel in the connection pixel set in the rectangular area and a pixel other than the connection pixel set in the rectangular area is smaller than a predetermined threshold value.

3. The image processing apparatus according to claim 1, wherein the binary image generating unit is further configured to identify whether the connection pixel set is a character or non character by comparing a difference between a largest value and a smallest value of the color differences in the connection pixel set with the color difference threshold value.

4. The image processing apparatus according to claim 1, wherein the binary image generating unit is further configured to identify whether the connection pixel set is a character or non character by comparing differences between largest values and smallest values of luminance differences and color differences between pixels of the connection pixel set in the rectangular area and pixels other than the connection pixel set in the rectangular area with the color difference threshold value.

5. The image processing apparatus according to claim 1, wherein the binary image generating unit is further configured to identify whether the connection pixel set is a character or non character by comparing a dispersion value of the color differences in the connection pixel set with the color difference threshold value.

6. The image processing apparatus according to claim 1, wherein the binary image generating unit is further configured to identify whether the connection pixel set is a character or non character by comparing a dispersion value of differences between largest values and smallest values of luminance differences and color differences between pixels of the connection pixel set in the rectangular area and pixels other than the connection pixel set in the rectangular area with the color difference threshold value.

7. The image processing apparatus according to claim 1, wherein the binary image generating unit is further configured to change the color difference threshold value on the basis of an average value of the color differences.

8. The image processing apparatus according to claim 1, further comprising a connection pixel combining unit configured to detect the connection pixel sets to which the circumscribed rectangles are close to each other and to group the detected connection pixel sets as one connection pixel set.

* * * * *